United States Patent [19]
Schwartz

[11] 3,719,282
[45] March 6, 1973

[54] UNIVERSAL COFFEE FILTER

[75] Inventor: Harlan A. Schwartz, Manitowoc, Wis.

[73] Assignee: Schwartz Manufacturing Company

[22] Filed: Nov. 16, 1970

[21] Appl. No.: 89,616

[52] U.S. Cl. ............................................. 210/477
[51] Int. Cl. ............................................. B01d 35/28
[58] Field of Search ........ 210/477, 482, 483; 99/295, 99/312, 77.1

[56] References Cited

UNITED STATES PATENTS

| 2,271,579 | 2/1942 | Wright | 210/477 UX |
| 3,250,398 | 5/1966 | Adiletta | 210/477 UX |
| 3,386,586 | 6/1968 | Ackerman | 210/477 |
| 3,343,682 | 9/1967 | Harvith | 210/477 |

Primary Examiner—Samih N. Zaharna
Assistant Examiner—F. F. Calvetti
Attorney—Dressler, Goldsmith, Clement & Gordon

[57] ABSTRACT

A coffee filter element universal to coffee baskets having bases of varying sizes and shapes. A plurality of slits extending inwardly from the periphery of the filter define portions adapted to fold upwardly at the vertical wall of a basket and to substantially seal thereagainst, the central portion of the filter lying against the base of the basket, thereby, in baskets smaller than the filter element forming a lipped filter element. The filter element is slitted at its center to accommodate basket stems. The display and dispenser package is configured to be suspended and to contain a plurality of circular coffee filter elements.

13 Claims, 10 Drawing Figures

PATENTED MAR 6 1973 3,719,282
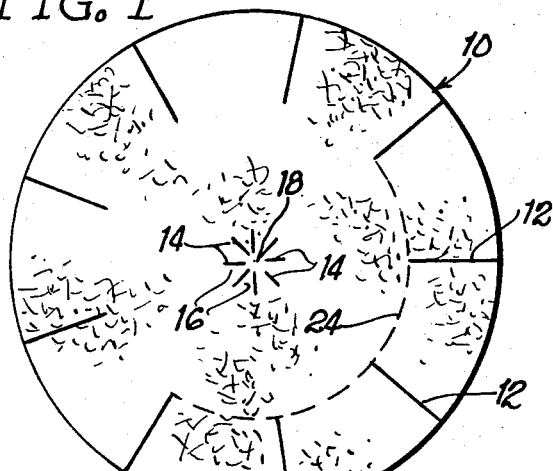
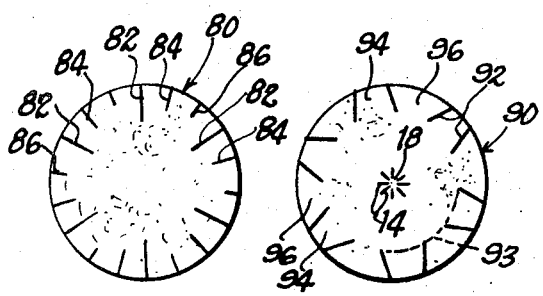
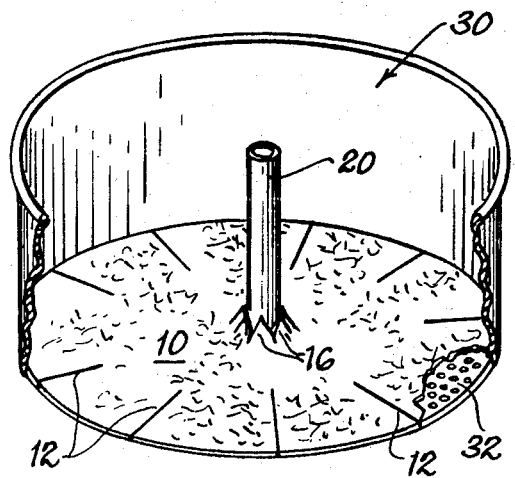
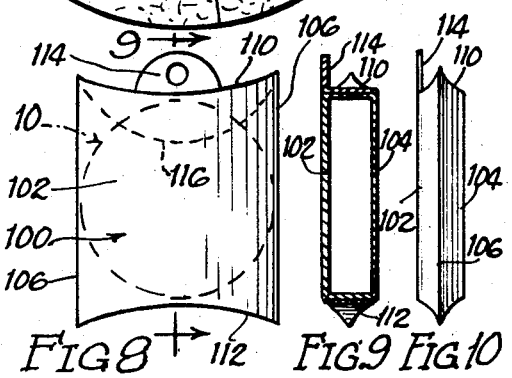
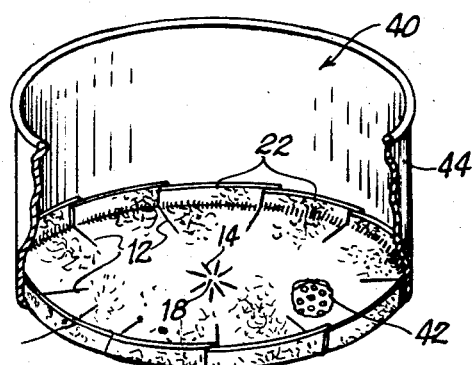
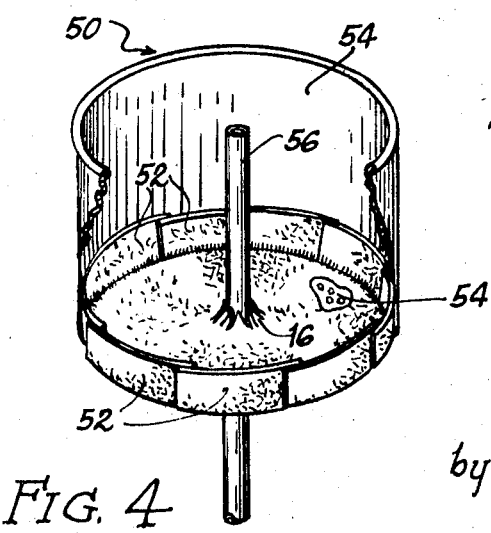
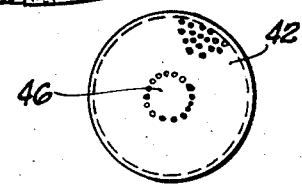
INVENTOR
Harlan A. Schwartz
by Dressler, Goldsmith, Clement and Gordon
Attys

UNIVERSAL COFFEE FILTER

This invention relates to a coffee filter sheet which is universal to a range of sizes of coffee baskets, and is adapted for use with coffee makers having a basket stem, as in a percolator, and with coffee makers having no basket stem, as in a dripolator.

There are a variety of available coffee filter sheets which are presently used by placing them in coffee baskets at their bases. Because coffee baskets define small perforations at their bases, through which coffee brew passes into the coffeepot, coffee grounds and sediment frequently also pass through those perforations and into the coffeepot below. Accordingly, it has been found increasingly desirable to use filter sheets such as filter papers, at the base of the baskets, upon which the ground coffee is placed, for perking or dripping.

Coffee makers, and in particular domestic coffee makers, utilize baskets of different base diameters and shapes depending upon the manufacturer and model. Such baskets may range from about 2½ inches in diameter to as much as more than 5 inches in diameter, although most fall within the range of 2½ inches to 4½ inches. That being so, it has been generally necessary to manufacture and sell a number of circular coffee filter sheets ranging in quarter inch or half inch increments in diameter from about 2½ inches to as much as 5 inches. Such baskets may also be somewhat oval.

Various proposals for making coffee filter sheets or elements universal to a range of coffee basket sizes have been made. In Harvith U.S. Pat. No. 3,343,682, filter elements of differing diameters may be made from a single large diameter filter sheet which has a series of circular tear strips concentric with its center. That sheet requires the careful separation of annular portions of the sheet by a user, which is both difficult and time consuming. Other patents, such as that to Cirrincione, U.S. Reissue Pat. No. Re. 26,716, have proposed the formation of a pouch as is illustrated therein. Such a pouch is only adaptable for use in a percolator in which a basket stem is provided. Where no basket stem is provided, such as in a dripolator, such a pouch cannot readily be made. In any event, the pouch is time consuming to form and use.

In accordance with this invention, an effective filter sheet universal to a range of different coffee basket dimensions is provided. A single filter sheet, such as a paper-like, non-woven fabric of a given diameter, is configured effectively to seal the base of coffee baskets of different diameters. This is accomplished by providing a series of spaced narrow slits extending from the outer periphery of the filter paper inwardly. When a filter paper is slitted in that fashion, and is pressed downwardly into the base of a coffee basket having a diameter smaller than that of the filter paper itself, the portions of the filter paper adjacent the slits will overlap at the slitted edges to form a peripheral lip lying against the vertical wall of the filter basket. The entire base of the filter basket will be covered by a central portion of the filter paper itself.

To make such a universal filter sheet usable in either dripolators or percolators, preferably the center of the filter sheet is provided with a plurality of slits, defining a series of pie-shaped segments or flaps which will snugly seal against the upwardly extending basket stem when a stem is present. When a dripolator is used (i.e., no basket stem is present), the slits are so narrow as to substantially prevent the passage of coffee grounds or sediment therethrough, especially because the central portion of the basket is usually imperforate.

Filter sheets made in accordance with this invention have been found to satisfactorily filter coffee in baskets ranging from diameters of as little as 2½ inches to as much as 4½ to 5 inches or more.

Further advantages, features and objects of this invention will become apparent from the following description and drawings of which:

FIG. 1 is a plan view of a preferred embodiment of a filter sheet of this invention;

FIG. 2 is a perspective view of the filter sheet of FIG. 1 positioned at the base of a percolator basket;

FIG. 3 is a perspective view of the filter sheet of FIG. 1 positioned at the base of a dripolator basket smaller in diameter than that of FIG. 2;

FIG. 4 is a perspective view of the filter sheet of FIG. 1 positioned at the base of a percolator basket smaller in diameter than the basket of FIG. 2;

FIG. 5 is a bottom view of the dripolator basket of FIG. 3;

FIG. 6 is a plan view of another embodiment of the filter sheet of this invention;

FIG. 7 is a plan view of a further embodiment of a filter sheet of this invention;

FIG. 8 is a front view of a package for containing filter sheets of FIG. 1;

FIG. 9 is a cross-sectional view taken substantially along the line 9—9 of FIG. 8; and FIG. 10 is an edge view of the package of FIG. 8.

Referring first to FIG. 1, filter sheet 10 is configured to be universal to a series of coffee baskets having the same base configuration but having different diameters. The filter sheet 10 may be of any suitable material, but preferably is of a thin paper-like, non-woven fabric presently known to the art and presently used for coffee filtering.

Filter sheet 10 defines a plurality of narrow slits 12, the edges of which slits contact and abut each other. The slits are made by a sharp edge cutting tool, as by a cutting blade. Optimally, the slits are nine in number, are radial and are equidistantly spaced (at 40° intervals) about the periphery of the filter sheet 10.

In a presently preferred embodiment, the flat paper-like filter sheet 10 is 4½ inches in diameter. Each of the slits 12 projects inwardly from the periphery of the filter sheet a radial distance equal to at least one-half inch and preferably 1 inch. As such, filter sheet 10 will serve to cover the bases of coffee baskets having diameters ranging from 2½ to 4½ inches. It has been determined that with coffee filter sheets made of filter paper of this size that nine slits 12 spaced at 40° intervals about the periphery of sheet 10 will conform most effectively and readily to baskets within that range of diameters. However greater or lesser numbers of slits may be used to obtain similar results, although the optimum appears to be nine.

Filter sheet 10 also desirably defines a plurality of slits, such as radial slits 14, at its center. As illustrated in FIGS. 2 and 4, the flaps or pie-shaped segments 16 defined between pairs of adjacent slits 14 will be up-struck by a coffee basket stem 20 when the coffee filter used in conjunction with a percolator basket. The pie-shaped segments will substantially seal about the coffee basket stem 20 thereby substantially to prevent the passage of grounds and sediment below the filter paper and through the bottom of the coffee basket itself.

It will be noted that each of the radial slits 14 terminates adjacent a central tab 18. This tab serves to hold all of the pie-shaped segments 16 closed when the filter is used in a dripolator. Also tab 18 separates easily when the filter is pushed onto a percolator stem, thereby to facilitate the clean breaking of the slits and the consequent conformity of the segments 16 to the stem. Furthermore, the provision of the central tab facilitates the formation of the slits in the cutting. When so many cutting edges must accurately meet at a point, it is very difficult accurately and economically to make such cutting edges and to maintain the cutting edges. Hence, it frequently occurs that the paper is crushed rather than slitted at the center, resulting in improperly cut slits, and inoperative slits. By providing the central tab, substantially improved and consistent slitting, hence conformity to the basket stem results.

The manner in which a filter sheet 10 is adapted to be used in conjunction with filter baskets is illustrated in FIGS. 2, 3 and 4. In a coffee basket 30 having the same base diameter as the filter sheet 10, the sheet 10 will simply be laid into the bottom of a basket 30 (see FIG. 2) to cover its base 32. The pie-shaped segments 16 will be upstruck by the stem 20 to substantially seal thereabout. Because there is substantially no space between the edges defining the slits 12, no coffee grounds will pass therebetween. Thus, the coffee filter sheet 10 will provide a barrier across the entire base 32 of the filter basket 30 to prevent the passage of coffee grounds and sediment downwardly through the perforated base of the coffee basket. However, because the paper filter sheet is porous, it will not interfere with the passage of the water and coffee brew therethrough.

Referring now to FIG. 3, a coffee basket 40 having a diameter less than that of a filter sheet 10 is illustrated. Coffee basket 40 defines a perforated base 42 and an upstanding cylindrical wall 44. Base 42 defines an imperforate central portion 46 (FIG. 5) usually wider than the effective diameter of slits 14 enhancing sealing centrally in the slitted area of the filter sheet. Cylindrical wall 44 is imperforate, as is the case with most coffee baskets with which the filters of this invention are especially intended to be used. Some baskets do have perforated sidewalls and the filter of this invention is also adapted to be used with those.

Coffee filter paper 10 is pressed downwardly into the base 42 of coffee filter basket 40 until the central portion of the filter paper 10 lies flat against perforated base 42. FIG. 5 illustrates base 42 of basket 40 and is typical of the bases of the other coffee baskets, except that there is no central opening in the imperforate central area 46 as is provided in percolator baskets for a basket stem. Because the diameter of the base is less than that of the filter paper 10, the edges of the slits 12 will separate at the wall 44 to allow the peripheral portions 22 of the filter paper 10 to bend sharply upwardly and to overlap slightly against wall 44 as illustrated in FIG. 3. The peripheral portions 22 will preferentially tend to alternately overlap when this occurs. The peripheral portions 22 thus tend to form a lip integral with the central portion of the filter paper 10 thereby to form a lipped filter cup in filter basket 40. The slit edges, of course, tend to slide over each other, thereby to minimize kinking. While straight edges operate well, curved or arcuate slits might also be used.

In FIG. 3, the diameter of the filter basket is greater than the diameter of the imaginary circle 24 illustrated in FIG. 1. Imaginary circle 24 is concentric with the periphery of the sheet 10. Of course this leaves portions of the slits 12 lying over the base 42.

In FIG. 4, the diameter of coffee basket 50 is substantially the same as the diameter of the imaginary circle 24. Thus, the portions 52 of the filter sheet 10 are of substantially the same height as the length of the slits 12, which in the specific coffee filter sheet 10 referred to above would be one inch. Filter sheet 10 in FIG. 4 is positioned in the base 54 of the filter basket 50 in the same manner that sheet 10 was placed in the filter basket of FIG. 3. Thus, the portions 52 tend to overlap in the same manner in which portions 22 of FIG. 3 overlapped, thereby to form a lip against the wall 54. Together with the central base portion of the filter sheet, the lip defines a generally cylindrical lipped filter cup in the base of the coffee basket 50.

In FIG. 4, which illustrates a percolator basket, a stem 56 projects through the center of sheet 10 thereby upsetting pie-shaped portions 16 which substantially seal thereagainst substantially to prevent the passage of coffee grounds and sediment between stem 56 and portions 16.

It should be noted that stems 20 and 56 are illustrated as being of different diameters. Slits 14 which define portions 16 are desirably about one-quarter inch in length and centrally meet tab 18 (which is about one-sixteenth inch in diameter) thereby to accommodate filter stems of different diameters. Basket stems generally range between five-sixteenths inch and seven-sixteenths inch in diameter.

FIG. 6 illustrates a further embodiment of a filter sheet of this invention. In FIG. 6 a filter sheet 80 defines a plurality of radial slits. These radial slits are shown to comprise three sets, each set extending inwardly from the periphery of the filter sheet 80 to an imaginary circle concentric with the periphery of the sheet.

A first set of slits 82 extend inwardly from the periphery to a first innermost imaginary circle. This set of slits is adapted to be used in conjunction with a filter basket having a diameter substantially equal to the imaginary circle to which slits 82 extend. A second set of slits 84 extends inwardly to a second imaginary circle and is adapted to be used primarily when a coffee filter sheet basket has a diameter substantially equal to the diameter of that imaginary circle. Similarly, a third set of slits 86 is provided which slits extend inwardly to an imaginary circle and which are adapted to be used when a filter basket having a base diameter equal to the diameter of that imaginary circle is to be used with a filter sheet 80. Desirably sheet 80 may also define central diametric slits to accommodate a basket stem.

FIG. 7 illustrates yet another embodiment of a filter sheet of this invention. Filter sheet 90 defines a plurality of non-radial slits 92 extending inwardly to a first imaginary circle 93 concentric with the periphery of the filter sheet 90. Desirably the projections of these slits are tangential to one or two imaginary circles concentric with the center of sheet 90, which circles lie between the center of the sheet and imaginary circle 93. These slits 92 extend inwardly from the periphery and define between them alternate portions 94 and 96 of different sizes, but which are repeated about the periphery of the filter sheet. These portions will overlap in coffee filter baskets generally in the manner described in conjunction with filter sheet 10 to provide a filter surface at the base of a coffee basket which is substantially impervious to the passage of coffee grounds therethrough. Sheet 90 may also define central slits 14 to accommodate basket stems.

FIGS. 8 to 10 illustrate a presently preferred embodiment of a display and dispenser package 100 containing a plurality of filter sheets, such as filter filter 10, 80 and 90. Package 100 comprises a front section 102 and a back section 104 interconnected at their side edges 106. The distance between side edges 106 is only slightly greater than the diameter of the filter sheets to be contained and, as will be seen from FIG. 8, the closed top edge 110 and the closed bottom edge 112 are convexly curved or arcuate so that centrally of the package they are spaced apart a distance substantially equal to the diameter of the contained filter sheets and to the distance between side edges 106. A contained filter sheet 10 is illustrated in dotted line in FIG. 8. Package 100 includes an integral perforated tab 114 suitable for hanging from a display rack. The package defines in its front section or back section an arcuate serrated line of separation 116 which is adapted to be severed and removed at the closed top edge of the package thereby to provide access to the top of a filter sheet 10 for removal of one of the multiplicity of enclosed filter sheets 10 for use.

What is claimed is:

1. A universal filter adapted for use with one of a series of coffee baskets of varying base sizes and shapes, said filter comprising a thin flat porous filter sheet, said filter sheet having a plurality of spaced narrow slits extending inwardly of the filter sheet from the outer periphery thereof, said slits having edges contacting and abutting each other, so that said filter may be used in coffee baskets having a base size equal to the dimensions of said filter, and said filter may also be used in coffee baskets having a base size smaller than the dimensions of said filter by allowing the peripheral portions of the filter to fold upwardly against the side of a coffee basket and slightly overlap to form a lipped filter cup at the base of a coffee basket.

2. The universal filter of claim 1 wherein said filter sheet is circular in plan view.

3. The universal filter of claim 2 wherein at least some of said slits extend inwardly of said periphery a radial distance equal to one-half inch.

4. The universal filter of claim 2 wherein said slits are radial slits and said filter sheet is a paper-like, nonwoven fabric.

5. The universal filter of claim 4 wherein said radial slits are equidistantly spaced about said periphery.

6. The universal filter of claim 2 wherein all of said slits extend radially inwardly substantially to an imaginary circle concentric with the periphery of said filter sheet.

7. The universal filter of claim 4 wherein said radial slits are nine in number and said filter sheet is about four and one-half inches in diameter.

8. The universal filter of claim 7 wherein each of said slits is about one inch in length.

9. The universal filter of claim 2 wherein some of said slits extend radially inwardly to a first imaginary circle concentric with the periphery of the sheet and some of said slits extend radially inwardly to a spaced second imaginary circle concentric with said periphery of the sheet.

10. The universal filter of claim 2 wherein a plurality of short narrow slits defining flaps are defined in said filter paper at its center, said flaps being adapted to sealingly receive a basket stem projecting upwardly from the base of a coffee basket.

11. The universal filter of claim 10 wherein said short narrow slits are radial slits and converge in a central tab from which said flaps are adapted to break away.

12. A universal filter for circular coffee baskets having bases of a range of different internal diameters, said filter comprising a circular piece of thin flat filter paper, said filter paper defining a plurality of narrow equidistantly spaced radial slits having edges contacting and abutting each other, extending inwardly from the periphery of said filter paper to an imaginary circle, concentric with said periphery and spaced from said periphery by at least one-half inch, and further defining a plurality of short slits adjacent its center, so that said filter may be used in coffee baskets having a base size equal to the dimensions of said filter, and said filter may also be used in baskets having a base size smaller than the dimensions of said filter by allowing the peripheral portions of the filter to fold upwardly against the side of a coffee basket and slightly overlap to form a generally cylindrical lipped filter cup at the base of a coffee basket.

13. In the universal filter of claim 12 wherein short short slits at its center are non-intersecting radial slits.

* * * * *